United States Patent [19]
Derstine

[11] Patent Number: 5,552,240
[45] Date of Patent: Sep. 3, 1996

[54] BATTERY OPERATED COMPONENT WITH REMOVABLE BATTERY HOLDER

[75] Inventor: Michael P. Derstine, Winston-Salem, N.C.

[73] Assignee: The Whitaker Corporation, Wilmington, Del.

[21] Appl. No.: 328,636

[22] Filed: Oct. 25, 1994

[51] Int. Cl.⁶ .................................................. H01M 2/10
[52] U.S. Cl. .............................. 429/96; 429/97; 429/100; 429/123
[58] Field of Search .............................. 429/96, 97, 100, 429/123

[56] References Cited

U.S. PATENT DOCUMENTS

| | | | |
|---|---|---|---|
| 4,828,944 | 5/1989 | Yabe et al. | 429/97 |
| 4,842,966 | 6/1989 | Omori et al. | 429/96 |
| 4,868,074 | 9/1989 | Omori et al. | 429/98 |
| 4,880,713 | 11/1989 | Levine | 429/100 |
| 4,943,498 | 7/1990 | Cooper et al. | 429/97 |
| 5,039,580 | 8/1991 | Mori et al. | 429/97 |
| 5,079,741 | 1/1992 | Kimura | 365/52 |
| 5,188,912 | 2/1993 | Katoh et al. | 429/96 |
| 5,193,220 | 3/1993 | Ichinohe | 455/89 |

*Primary Examiner*—Stephen Kalafut
*Assistant Examiner*—Richard H. Lilley, Jr.

[57] ABSTRACT

A battery (8) powered electrical device (10) is disclosed having an outer case and a battery holder (12) that is received within an opening in the outer case. The device (10) includes an electrical component (24) that is electrically interconnected to the battery (8). A latching mechanism is provided for latching the holder (12) within the case. A pair of resilient arms (102, 104) having projections (106) are cantilevered from the case on opposite sides of the opening and extend into the opening. When the holder (12) is inserted into the opening the projections (106) engage depressions (74, 76) in the sides of the holder (12) to effect the latching while minimizing the outer peripheral size of the holder (12).

7 Claims, 6 Drawing Sheets

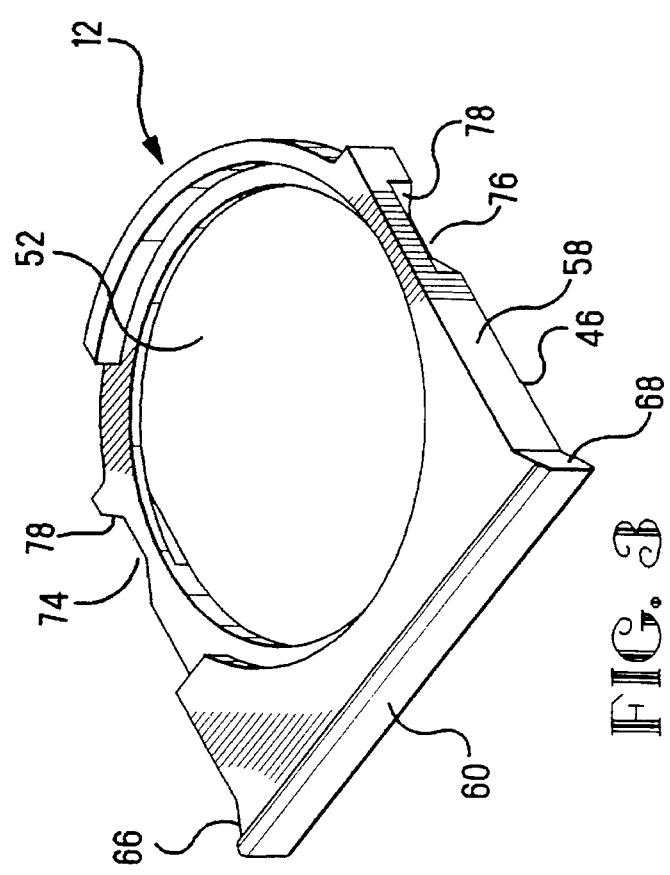
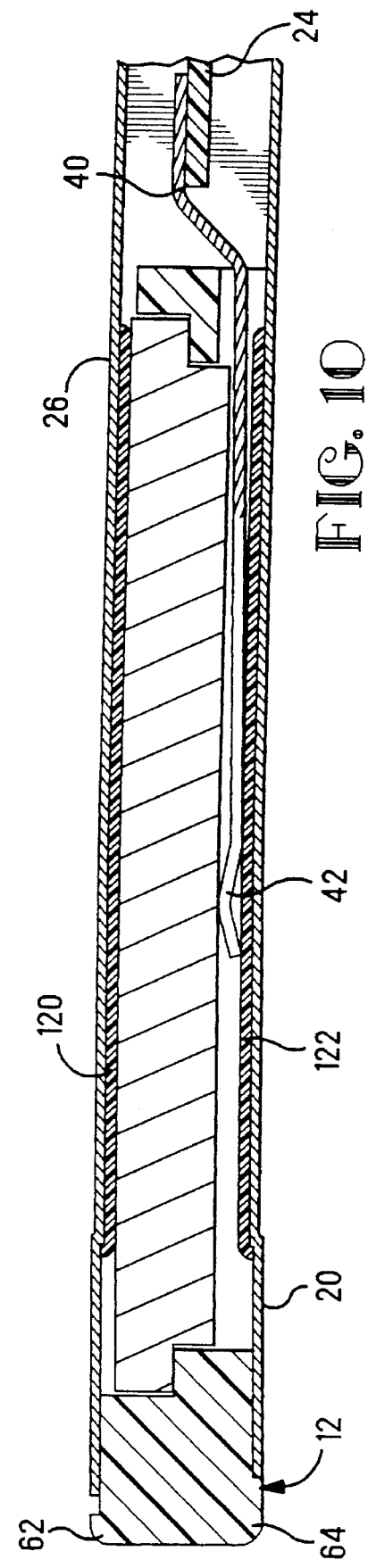

5,552,240

BATTERY OPERATED COMPONENT WITH REMOVABLE BATTERY HOLDER

The present invention is related to electrical components having internal batteries, and similar devices, wherein the battery is contained in a removable tray or holder that, when inserted into an opening in the component, is latched within the opening so that the battery is in electrical engagement with the component.

BACKGROUND OF THE INVENTION

Certain electrical components, such as memory cards and the like, that are occasionally disconnected from their host equipment and then reconnected at a later time, require a portable source of power to maintain the data contained in their memory. Such a power source is typically a battery that is either secured within the case of the component or, more conveniently, is arranged in a removable battery holder so that the battery can easily be replaced when desired. An electrical component having such a removable battery holder is disclosed in U.S. Pat. No. 4,842,966 which issued Jun. 27, 1989 to Omori et al. The battery holder disclosed in the '966 patent is arranged to fit into an opening in a front edge of the component and has a pair of integrally formed arms resiliently attached to each side thereof that are biased outwardly. Each arm has a projection extending outwardly that engages a depression in a wall of the opening for latching the holder within the opening. When removing and reinserting the battery holder, the arms are deflected into clearance cutouts adjacent each arm. Since the two arms and their clearance cutouts require substantial space, the battery is required to be well into the opening and away from the front edge of the component so that the battery holder penetrates relatively deep into the component. In certain components where space is at a premium, it is desirable to make the battery holder as small as possible. U.S. Pat. No. 5,039,580 which issued Aug. 13, 1991 to Mori et al. discloses an electrical appliance having a battery holder that is relatively small, with respect to the battery. The small size of the battery holder is achieved in part by using a sliding latch member that engages a notch in the side of the holder near the front edge of the appliance. While the desired smaller size of the battery holder is provided, it is at the cost of having a sliding latch, which is an additional part that must be manufactured and assembled.

What is needed is an electrical component having a removable battery holder that is of relatively small size and that has a latching mechanism that is integrally formed in the holder and the component housing.

SUMMARY OF THE INVENTION

A battery powered electrical device is disclosed having an outer case with a first opening therein, an electrical component within the outer case adjacent the first opening, a battery, and a holder for holding and positioning the battery within the first opening in electrical engagement with the component. The holder includes a generally flat body having top and bottom opposite major surfaces, a front surface and two opposite side surfaces each being vertically disposed and extending between the top and bottom major surfaces. A second opening is formed through the body intersecting the top and bottom surfaces and is adapted for receiving the battery therein. Two depressions are provided, one depression in each of the two side surfaces and positioned substantially further from the front surface than is the axis of the second opening. The outer case includes a pair of arms attached thereto extending cantilevered into the first opening on opposite sides of the opening. Each arm has a projection on its free end. One of the projections extends into one of the depressions and the other projection extends into the other depression thereby latching the holder within the first opening and holding the battery in electrical engagement with the component.

DESCRIPTION OF THE FIGURES

FIG. 3 is an isometric view of the battery holder;

FIG. 10 is a cross-sectional view taken along the lines 10—10 in FIG. 9.

DESCRIPTION OF THE PREFERRED EMBODIMENT

Figure 1:
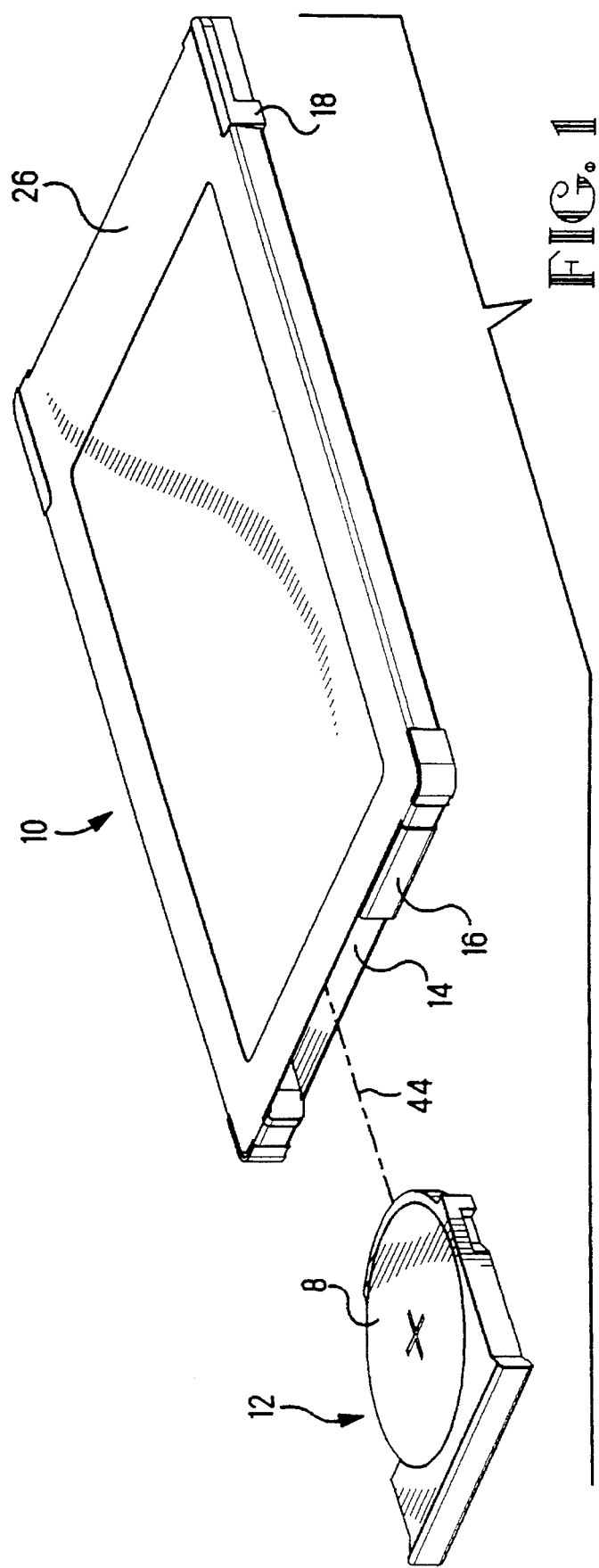
FIG. 1 is an isometric view of a memory card and battery holder incorporating the teachings of the present invention.
Figure 2:
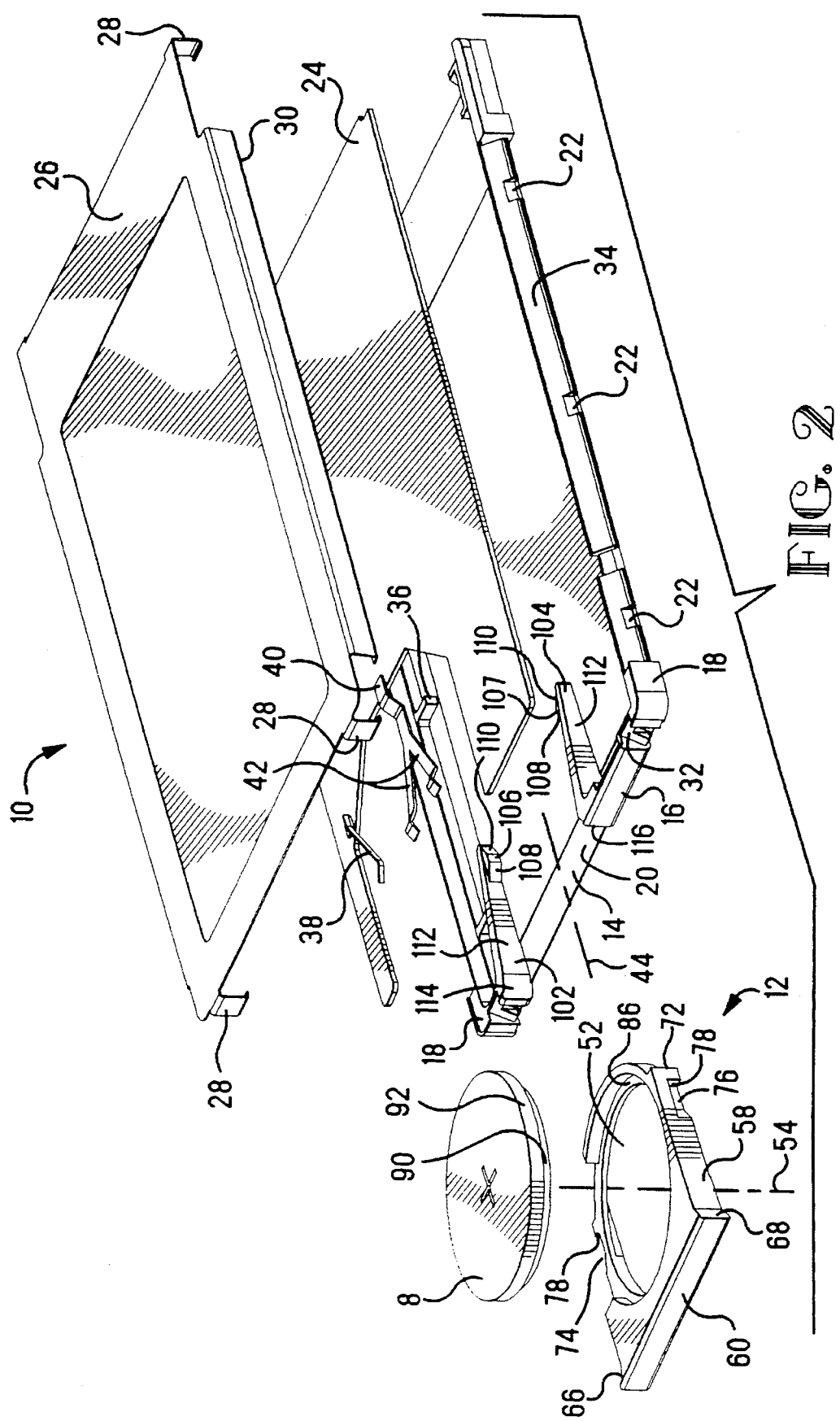
FIG. 2 is an exploded parts view of the memory card and battery holder shown in FIG. 1.

There is shown in FIG. 1 an electrical device 10, in the present example a memory card, and a battery holder 12 containing a button battery 8. An opening 14 is formed in a front edge 16 of the memory card 10 for receiving the battery holder 12. As shown in FIGS. 1 and 2, the memory card 10 consists of a stainless steel bottom cover 20, a plastic frame 18 that is insert molded to the bottom cover, an electrical component 24 such as a circuit board containing electrical circuitry, and a stainless steel top cover 26 that is attached to the frame by means of tabs 28 and 30. The frame 18 includes chamfered edges 32 and 34 so that when the top cover 26 is assembled to the frame, the tabs 28 and 30 engage the chamfered edges and are cammed outwardly around the outer edge of the frame and then they snap into place securing the top and bottom covers to the frame. The frame 18 includes boss features, such as at 36 for positioning and holding the circuit board 24 within the memory card. A positive battery terminal 38 is attached to the circuit board 24 and extends into the opening 14 adjacent one side thereof for electrically engaging the side of the battery 8. A negative battery terminal 40 is also attached to the circuit board in a position that is somewhat central to a longitudinal axis 44 of the opening 14 and has a pair of resilient contact arms 42 that extend into the opening 14 adjacent the bottom cover 20, as best seen in FIG. 10. The contact arms 42 are biased upwardly away from the bottom cover into electrical engagement with the bottom of the battery 8. The positive and negative battery terminals 38 and 40 are electrically interconnected to circuitry on the circuit board 24, in the usual manner.

Figure 4:
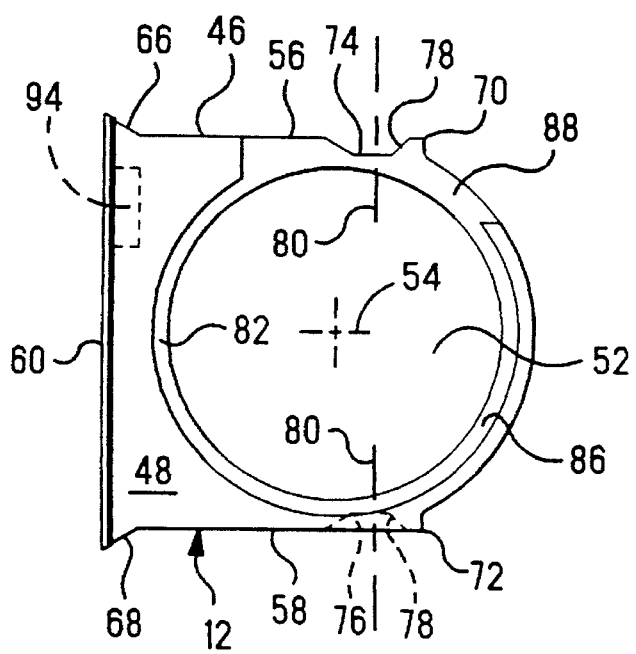
FIGS. 4, 5, and 6 are top, end, and side views, respectively, of the battery holder shown in FIG. 3.
Figure 5:
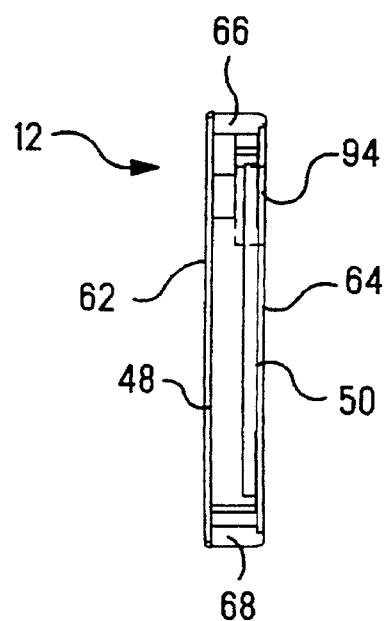
Figure 6:
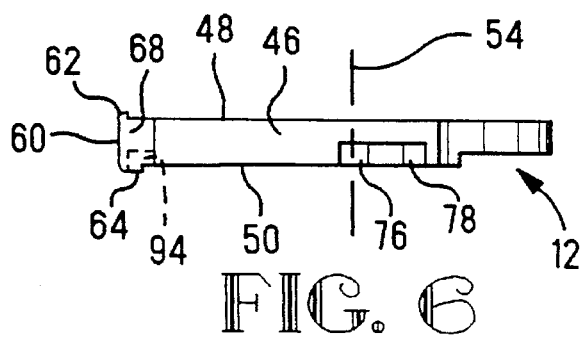

As best seen in FIGS. 3 through 6, the battery holder 12 has a generally flat body 46 with top and bottom major surfaces 48 and 50, respectively. An opening 52 is formed through the body 46, intersecting the top and bottom surfaces 48 and 50 so that an axis 54 of the opening 52 is perpendicular to the top surface 48. Two opposite side surfaces 56 and 58 and a front surface 60, shown in FIG. 4, extend vertically between the top and bottom surfaces 48 and 50. The front surface 60 includes a top lip 62 and a bottom lip 64 that extend away from the top and bottom surfaces 48 and 50, respectively, an amount that is equal to the thicknesses of the top and bottom covers 26 and 20. Two beveled surfaces 66 and 68 are formed between the front surface 60 and the two side surfaces 56 and 58 so that the beveled surfaces diverge in the direction toward the front surface, as best seen in FIG. 4. The two side surfaces 56 and 58 terminate in corners 70 and 72, respectively, that are slightly rounded for a purpose that will be explained. A pair of depressions 74 and 76 are formed in the side surfaces 56 and 58 respectively. Each depression includes a camming surface 78 that is inclined with respect to the front surface 60 so that the two camming surfaces converge in a direction toward the front surface, as best seen in FIG. 4. The two depressions 74 and 76 are positioned well away from the front surface 60 and past the front edge of the opening 52, about the same distance as or greater than the distance between the axis 54 and the front surface, for a purpose that will be explained. Note that, in the present example, the centerlines 80, which represent the approximate center of the depressions 74 and 76, are positioned further from the front surface than is the axis 54. The opening 52 has a counterbore 86 that extends into the top surface 48. The top surface is cut away adjacent the side surface 56 down to the bottom of the counterbore thereby forming a recess 88, as shown in FIG. 4. The opening is sized to receive with clearance the smaller diameter 90 of the battery 8 while the counterbore 86 is sized to receive and locate the larger diameter 92 of the battery. A rectangular shaped recess 94 is formed in the bottom surface 50, as best seen in FIGS. 4, 5, and 6. The recess 94 has a depth that is equal to about one half the thickness of the body 46 and extends toward the front surface 60 and into the bottom rib 64 a slight amount. The recess 94 is used to aid in the removal of the battery holder 12 from the memory card 10, as will be explained below.

Figure 7:
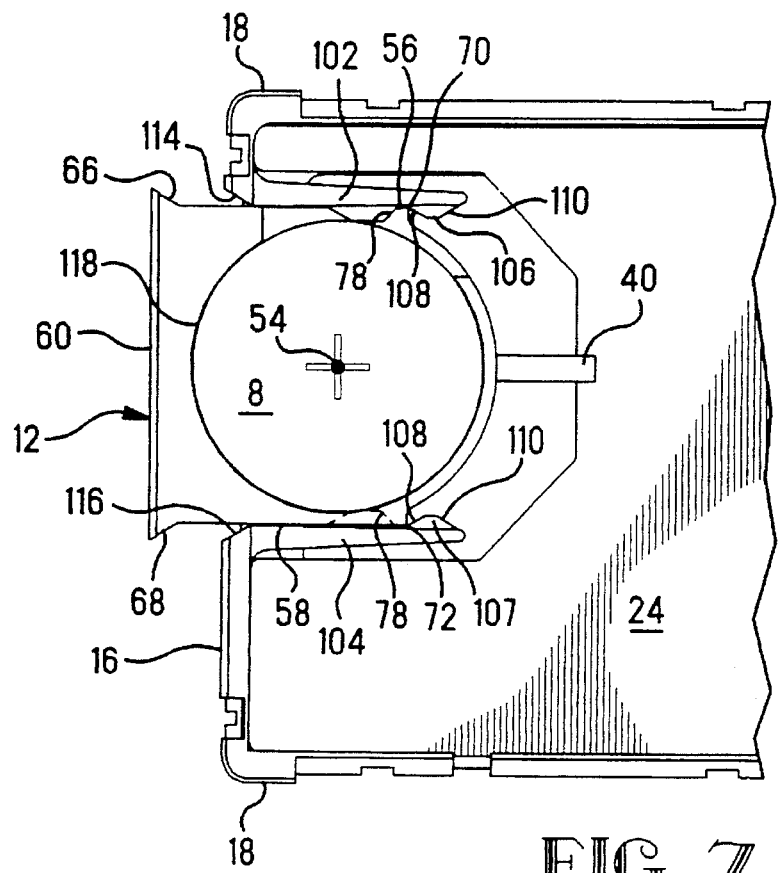
FIGS. 7, 8, and 9 are views of a portion of the memory card shown in FIG. 1 with the lid removed and showing the battery holder in various positions of engagement.
Figure 8:
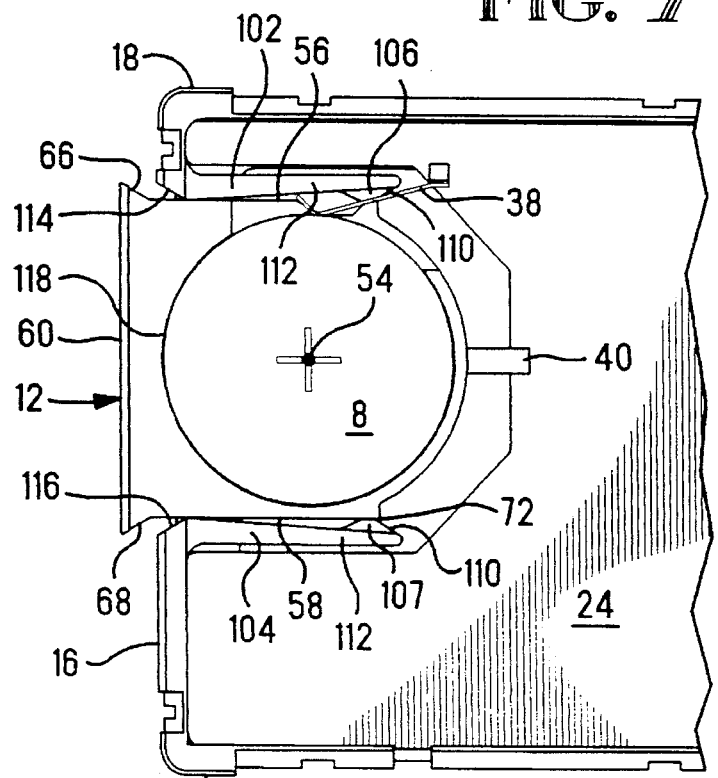
Figure 9:
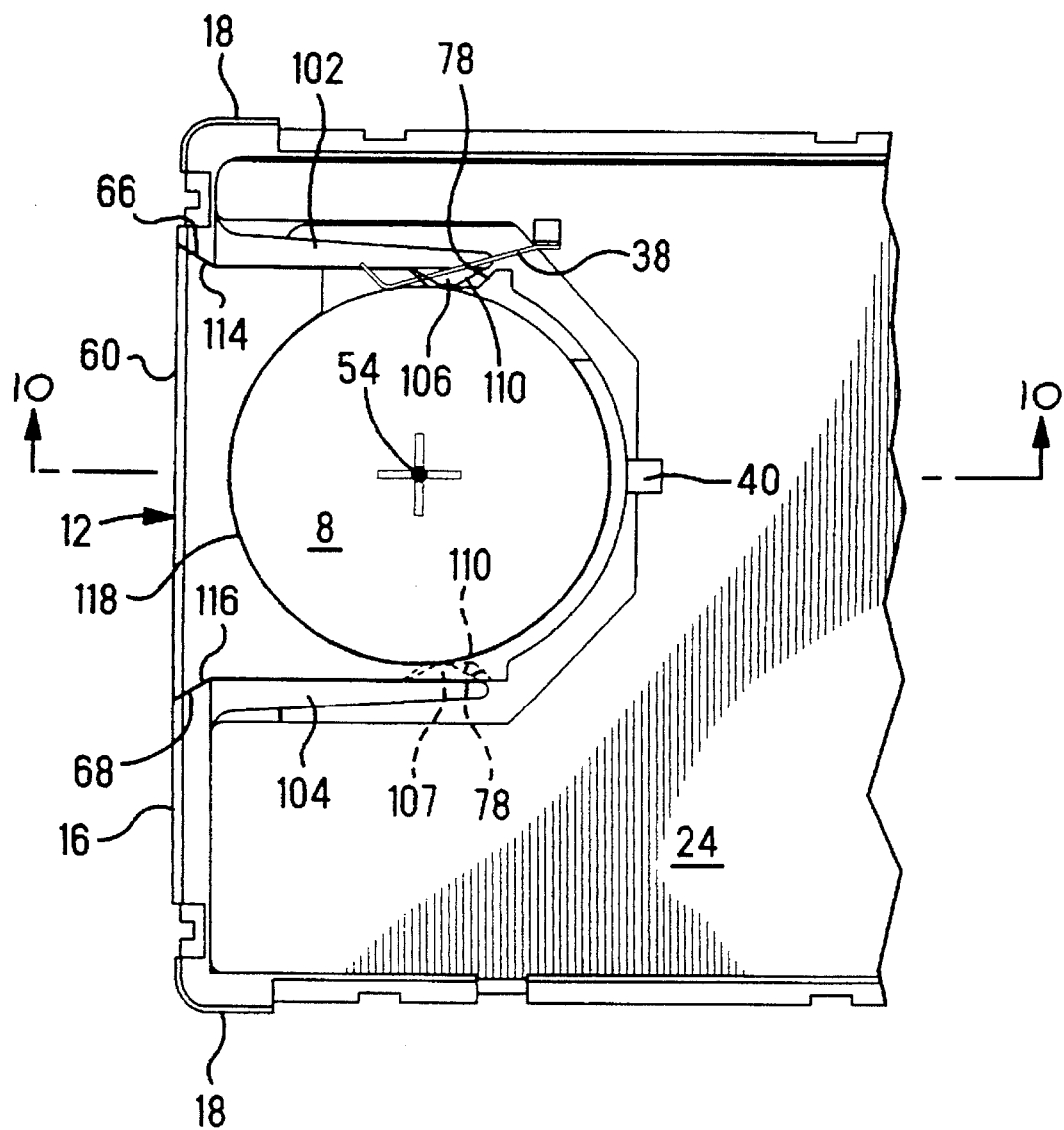

The frame 18 includes a pair of opposed arms 102 and 104 that are cantilevered from the frame and extend into the opening 14 along opposite sides thereof equidistant from the axis 44, as best seen in FIG. 2. Each arm includes a respective projection 106, 107 adjacent its free end that extends toward the axis 44 as shown. Each projection 106 and 107 includes a forward angled surface 108 and a rearward angled surface 110 that are arranged so that the two forward angled surfaces mutually diverge in a direction toward the front surface 60 while the two rearward angled surfaces mutually converge in that direction. Each of the two arms 102 and 104 includes a resilient beam 112 that biases its respective projection 106, 107 toward the axis 44 and into latching engagement with the depressions 74 and 76, respectively, when the battery holder 12 is inserted fully into the opening 14, as shown in FIG. 9. A pair of opposing chamfered surfaces 114 and 116 are formed in the frame 18 adjacent the sides of the opening 14, as best seen in FIGS. 2, 7, 8, and 9. The two chamfered surfaces 114 and 116 are angled to conform to the angles of the two beveled surfaces 66 and 68, respectively.

In operation, a button battery 8 is inserted into the opening 52 along the axis 54 so that the larger diameter 92 enters into the counterbore 86, resting on the bottom of the counterbore with the top surface of the battery flush with the top surface 48 of the holder 12, as shown in FIG. 1. The holder 12 and battery 8 are then aligned with and moved along the axis 44 so that the holder enters the opening 14, the chamfered surfaces 114 and 116 serving as lead in surfaces, and the corners 70 and 72 engage the forward angled surfaces 108 of the projections 106 and 107, respectively, as shown in FIG. 7. During this initial movement the positive battery contact 38 enters the recess 88 and engages the larger diameter 92 of the battery 8 and rides along its outer surface while elastically deflecting and concurrently the negative battery contact arms 42 engages the bottom of the battery 8 and ride along the bottom surface. As movement continues, the corners 70 and 72 cause the forward angled surfaces 108 to cam outwardly against the bias of the resilient portions 112 until the two projections 106 and 107 ride along the side surfaces 56 and 58, as shown in FIG. 8. As movement continues and the battery holder 12 reaches the fully inserted position, shown in FIG. 9, the projections 106 and 107 snap into their respective depression 74 and 76, thereby latching the holder in position within the opening 14 so that its front surface 60 is approximately flush with the front edge 16 of the memory card 10. In this position the beveled surfaces 66 and 68 of the holder 12 are closely adjacent the chamfered surfaces 114 and 116 of the frame 18 which center the holder within the opening 14 with very little axial or lateral play. Alternatively, the projections 106 and 107 can be positioned with respect to the depression 74 and 76, respectively, so that when the holder 12 is fully seated within the opening 14, the rearward angled surfaces 110 of the projections are in pressing engagement with the camming surfaces 78 of the holder. This provides a camming action against these surfaces tending to urge the holder 12 further into the opening 14 so that the beveled surfaces 66 and 68 are in pressing engagement with their respective chamfered surfaces 114 and 116 thereby eliminating any axial or lateral play of the battery holder. The battery holder 12 is easily removed from the memory card 10 by inserting a blade or other tool into the recess 94 and prying against the edge of the bottom cover 20 to urge the holder outwardly and begin moving it out of the opening 14. This movement causes the rearward angled surfaces 110 to cam outwardly on the forward angled surfaces 78 so that the arms 102 and 104 deflect outwardly until the projections 106 and 107 are free of the depressions 74 and 76. The battery holder 12 is then free to be removed from the opening 14 by grasping the top and bottom ribs 62 and 64 and gently pulling the holder away from the memory card while holding it in alignment with the axis 44. Note that when the battery holder 12 is fully seated, as shown in FIG. 10, the ribs 62 and 64 are spaced a small distance from the front edges of the top and bottom covers 26 and 20, respectively. The resilient portions 112 of the arms 102 and 104 have inherent spring characteristics that return the arms to their original positions as shown in FIG. 7. To provide sufficient resiliency for effecting the desired amount of movement of the projections 106 and 107, the arms 102 and 106 should be relatively long. That is, the arms should extend into the opening 14 so that the projections 106 and 107 are well past the front edge 118 of the battery 8 and, therefore, the depressions 74 and 76 are significantly further from the front surface 60 than the edge 118. In the present example the arms extend from the front edge 16 of the frame 18 into the opening 14 to a position that is past the axis 54 of the battery, as shown in FIG. 9.

The frame 18 and the top and bottom covers 20 and 26, respectively, may be made of any suitable material such as plastic or metal. However, when the top and bottom covers are metal a thin dielectric layer 120 must be arranged between the top surface of the battery 8 and the inside surface of the top cover 26 and a similar layer 122 must be arranged between the inside surface of the bottom cover 20 and the contact arms 42 and the bottom of the battery 8, as shown in FIG. 10. The battery holder 12 may also be made of metal if the battery 8 is suitably insulated, however, plastic is preferable.

An important advantage of the present invention is that a removable battery holder is provided having a latching mechanism that results in the outer periphery of the battery holder 12 being minimized thereby providing more useful space within the device 10 for the circuit board. Another important advantage is that the beveled surfaces 66 and 68 in cooperation with the chamfered surfaces 114 and 116 tend to guide and hold the battery holder within the opening in the device with little or no axial or lateral play. Additionally, the latching mechanism is integrally formed in the holder and the device housing thereby minimizing the number of parts that must be manufactured and assembled.

I claim:

1. A battery powered electrical device having an outer case with a first opening therein, an electrical component within said outer case adjacent said first opening, a battery, and a holder for holding and positioning said battery within said first opening in electrical engagement with said component, said holder comprising:

(a) a body having top and bottom opposite major surfaces, a front surface and two opposite side surfaces each being vertically disposed and extending between said top and bottom major surfaces;

(b) a second opening through said body intersecting said top and bottom surfaces, having an axis that is perpendicular to said top surface, wherein said second opening is adapted for receiving said battery therein when said battery is moved along said axis toward said second opening;

(c) two depressions, one depression in each of said two side surfaces, positioned further from said front surface than is said axis, and (d) first and second beveled surfaces, one of which is between one of said two side surfaces and said front surface and the other of which is between the other of said two side surfaces and said front surface, so that said first and second beveled surfaces mutually diverge toward said front surface, and wherein said case includes mating beveled surfaces that engage said first and second beveled surfaces for limiting lateral movement thereof with respect to said case when said holder is latched within said first opening, wherein said outer case includes a pair of arms attached thereto extending cantilevered into said first opening on opposite sides thereof, each arm having a projection on its free end, one of which extends into one of said depressions and the other of which extends into the other of said depressions thereby latching said holder within said first opening and holding said battery in said electrical engagement with said component.

2. The device according to claim 1 wherein each of said projections is further from said front surface than is said axis.

3. The device according to claim 2, wherein said mating surfaces are beveled inwardly on opposite sides of said first opening thereby serving as lead-in surfaces to guide said holder during insertion of said holder into said first opening.

4. The device according to claim 1 wherein each said arm includes a resilient portion arranged to urge said two projections toward each other and into said latching engagement.

5. The device according to claim 4 wherein each said depression has a first camming surface arranged to be in camming engagement with a respective projection when said holder is in said latching engagement so that when said holder is moved outwardly from said first opening, said projections are cammed out of said depressions against said urging of said resilient portions thereby disengaging said holder from said case.

6. The device according to claim 5 wherein each projection has a second camming surface facing outwardly from said first opening and arranged so that when said holder is urged into said first opening, said holder engages said second camming surfaces thereby deflecting said two projections away from each other against said urging of said resilient portions so that said projections ride along said side surfaces until they engage said depressions.

7. The device according to claim 1 wherein said holder includes a recess in said bottom major surface adjacent said front surface and arranged for inserting a blade therein to pry against said case and urge said holder out of said first opening of said case.

* * * * *